Aug. 23, 1932.   J. R. PEIRCE   1,873,023
COFFEE BREWING DEVICE
Filed July 13, 1929
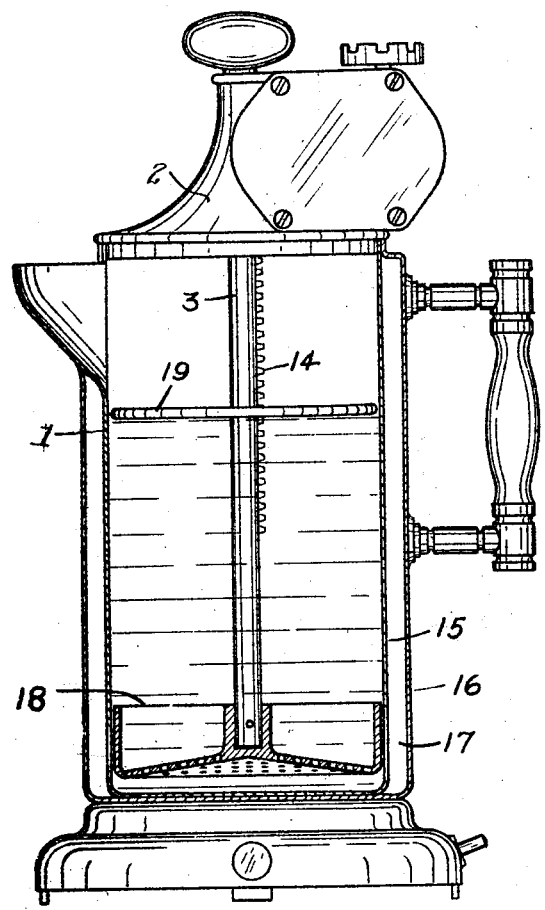
INVENTOR
John Royden Peirce
BY
A. C. Maby
ATTORNEY Patented Aug. 23, 1932

1,873,023

UNITED STATES PATENT OFFICE

JOHN ROYDEN PEIRCE, OF NEW YORK, N. Y.

COFFEE BREWING DEVICE

Application filed July 13, 1929. Serial No. 377,984.

This invention relates to a method of and means for brewing coffee. In my copending application Serial No. 224,899, filed October 8, 1927, I disclosed a coffee brewing device in which a basket or container for the coffee grounds adapted to be suspended in a pot or outer container, means being provided to raise the basket above the water in the pot after a predetermined time. In another copending application Serial No. 322,372, filed November 28, 1928, I disclosed a device in which the basket is repeatedly lowered and raised several times during the brewing process. In the device of the first case, the grounds are removed from the water before the latter, by attacking the fibre of the grounds, shall acquire a woody taste and develop other undesirable qualities. In the second case, the rasing and lowering of the grounds, the time may be shortened and also a more thorough brewing is induced. The present invention is an improvement upon the inventions disclosed in both of these cases.

In the percolator and drip and other methods of making coffee, the grounds are closely packed in a relatively small space. The result is that the outer grounds become saturated more rapidly than those farther in. The flavoring and other desirable properties are thus extracted from the outer grounds sooner than from the inner grounds. But the grounds that have thus served their usefulness must continue to remain in the water or brew until the inner grounds become thoroughly saturated and the desired properties have been extracted from them. During this extra period of brewing, the outer grounds continue to affect the coffee brew.

According to my invention, means are provided for causing all of the grounds to become saturated as quickly as possible. The grounds are scattered easily so that the water can quickly reach each ground and circulate freely between the grounds.

The drawing shows a side elevation partly in section.

In the drawing the coffee pot is shown at 1. The opening at the top is large, being substantially as wide as the diameter of the pot. The cover 2 contains time-controlled mechanism such as is shown in the first of my abovementioned cases. A stem 3 reaches down from the mechanism and is attached to the tray 18.

In the form of the invention shown the pot comprises inner and outer walls 15, 16, forming a vacuum space 17. A tray or basket 18 attached to the stem 3 is provided for the coffee grounds. The tray is slightly smaller in diameter than the inside diameter of the pot so that the grounds may not settle at the bottom of the pot. The bottom of the tray is perforated and may be concave as shown so as to increase the tendency of the water, as it becomes heated at the bottom of the pot, to rise through the tray instead of around the outside thereof. The narrowness of the space between the tray and the pot will also aid in causing the water to rise through the tray and the coffee grounds therein. However, such space may be sufficient to permit water to flow downwardly as rapidly as necessary to permit proper circulation.

A piece of wood 19 or other substance capable of floating is provided to press the coffee grounds down into the water so that they will become saturated and sink more rapidly. This will cause the diffusion to take place more rapidly and uniformly throughout the entire mass of grounds. All of the grounds may thus be removed from the brew as soon as the desired value has been extracted therefrom. The float 19 is substantially as large as the inside of the pot so that the grounds will not be forced above it. Also, it is loose with respect to the stem 3 and rack teeth 14. After the proper time has elapsed, the stem 3 will be raised to lift the tray with the grounds out of the coffee brew. When the tray reaches the float, it will lift the latter.

Having described my invention what I claim and desire to secure by Letters Patent is:

1. In a coffee brewing utensil, a pot, a tray within the pot for grounds and a separate float loose with respect to the tray for depressing the grounds contained in the tray.

2. In a coffee brewing device, a pot, a perforated tray within the pot for grounds, said tray having an outer diameter almost equal to the inner diameter of the pot and a float separate from the tray for depressing the grounds within the tray.

In testimony whereof I affix my signature.

JOHN ROYDEN PEIRCE.